3,660,523
ALUMINUM PRIMER CONTAINING EPOXIDE RESIN AND ISOCYANATE TERMINATED URETHANE PREPOLYMER
John R. Grawe, Metairie, La., and Raymond J. Bissig, Des Plaines, Ill., assignors to Desoto, Inc., Des Plaines, Ill.
No Drawing. Filed Feb. 25, 1970, Ser. No. 14,197
Int. Cl. C08g *45/12*
U.S. Cl. 260—830 P         17 Claims

ABSTRACT OF THE DISCLOSURE

Organic solution primers intended for application to a clean aluminum surface which enable the primed surface to be more securely bonded are provided by reacting a resinous polyepoxide with an isocyanate-terminated polyurethane. The polyurethane is a reaction product of excess organic diisocyanate and diol having a molecular weight up to amout 200, the molar ratio of diisocyanate to diol being in the range of 1.2:1 to 1.75:1 so that from 60 to 90% of the isocyanate functionality of the diisocyanate is consumed by reaction to produce the isocyanate-terminated polyurethane. The polyepoxide used has an epoxy equivalency of at least 1.4, and an hydroxy equivalency in the range of .75 to 1.9, and is reacted with the polyurethane with the hydroxy functionality of the polyepoxide being in the range of 2:1 to 4:1 with respect to the isocyanate functionality of the polyurethane.

---

The present invention relates to a primer intended for application to a clean aluminum surface which will enable the primed surface to be more adhesively bound or bonded to other surfaces and particularly to similarly primed surfaces. The invention is of particular value in the aircraft industry where it is frequently desired to minimize mechanical fastening and provide a stronger bond by employing the full surface area of the panels to be bonded.

The performance requirements insisted upon by the aircraft industry are very high as is illustrated by the fact that conventional amine-cured epoxy resins are unsatisfactory because they do not provide sufficient bond strength whereas such adhesives are ordinarily considered to provide excellent bond strength. The requirements of the invention are particularly severe because the bond must be maintained at both high and low temperatures and the primer must possess considerable solvent resistance to resist potential attack by hydraulic fluids and to provide general resistance to corrosion.

In accordance with the invention an organic solution primer system is provided by reacting a resinous polyepoxide possessing epoxy and hydroxy functionalities with an isocyanate-terminated polyurethane which can be formed in situ or be the result of prepolymerization.

This system is formed in a relatively concentrated organic solvent medium and the hydroxy functionality of the polyepoxide is provided in excess and used to consume the isocyanate functionality of the prepolymer in a reaction which is carried out by heating to moderate temperature for several hours. In this way a solvent-soluble epoxy-functional resin is produced which is close to its gelation point, and which includes a polyurethane backbone, to confer the required properties on the final primer, and a plurality of epoxy groups for subsequent cure in conventional manner with conventional basic epoxy-curing agents primarily polyamines such as N-amino ethyl piperazine. While the organic amines may be used alone, it is particularly preferred to include a proportion of an amino-substituted polyalkoxysilane as will be illustrated. Di- and tri-alkoxysilanes may be used including hydrolysates which introduce the siloxane structure. The alkoxy group may contain from 1–4 carbon atoms, but is preferably methoxy or ethoxy, particularly the former.

The proportion of the amine curing agent is not critical but preferably the ratio of amino-hydrogen to the epoxy group is from .6 to 1 to 1.5 to 1. The term "epoxy" is intended to identify the 1,2-oxirane group.

As will be evident from the above, the epoxy functional resins of the invention are formed in organic solvent solution medium and then mixed with a curing agent such as a polyamine prior to use. This solution is then sprayed or otherwise applied to an aluminum surface to be primed.

The aluminum surface is prepared by cleaning the same with an acid etch, oxidizing acids such as chromic acids being particularly preferred. The cleaned surface is then coated and the coating is cured by baking for two hours at 250° F., though higher temperatures may be used for shorter times and even room temperature cure can be effected if enough time is used, e.g., 1 week.

Referring more particularly to the isocyanate-terminated polyurethane which is used, this is preferably a prepolymer formed by reacting an organic diisocyanate with a diol. The proportion of diisocyanate to diol can vary considerably from a molar ratio of 1.2 to 1 to 1.75 to 1, but the higher the diisocyanate ratio, the less of the prepolymer is later used in combination with the epoxy resin. The preferred ratios are from 1.3 to 1 to 1.6 to 1, a particularly preferred ratio of 1.43 to 1 being used herein as illustrative.

Based on the combined weight of the diisocyanate prepolymer and the polyepoxide, the prepolymer may constitute from 25% to 45% of the composite, the preferred range being from 30% to 40%. As indicated hereinbefore, the higher the diisocyanate to diol ratio, the less prepolymer is needed in the mixture.

While the diol and diisocyanate components are preferably prereacted, this is not essential, particularly when the diol contains two primary hydroxy groups in which event the prepolymer is formed first even when the polyepoxide is present.

In the reaction between the polyepoxide and the isocyanate prepolymer, the isocyanate functionality is intended to react preferentially with the hydroxy groups of the polyepoxide leaving the bulk of the epoxy groups available for subsequent cure. Accordingly, the polyepoxide must be appropriately selected to provide the results desired in the invention.

Any polyepoxide, aliphatic or aromatic, may be used so long as the polyepoxide has an epoxy equivalency of at least 1.4, preferably at least 1.7. Bisphenol-based polyepoxides are particularly preferred, especially those having an epoxy equivalency of from about 1.8 to 2.4. Diepoxides based on dihydric phenols constitute a preferred class of useful compounds. It is permissible to employ a higher epoxy equivalency, preferably not in excess of about 2.5, so long as the polyepoxide possesses the proper hydroxy value. An epoxy equivalency in the range of 2.1–2.3 is especially preferred. In the invention, it is intended that the isocyanate prepolymer crosslink polyepoxide molecules so that the epoxide groups are interconnected through a polyurethane internal structure. Accordingly, the hydroxy equivalency of the polyepoxide should vary in the range of .75 to 1.9 and preferably in the range of from 1.0 to 1.8. An hydroxy equivalency of 1.5 will be used herein as illustrative.

It is desired to point out that the prepolymer is a polyurethane which includes a plurality of internal urethane groups and terminal isocyanate groups.

Any organic diisocyanate may be utilized to form the polyurethane prepolymer. Lower isocyanate functionality will not produce a polyurethane polymer. Higher isocyanate functionality leads to premature gelation. The class of organic diisocyanates is well known and typified by tolylene diisocyanate. The conventional diisocyanates are usually aromatic and are useful, but the aliphatic diisocyanates are preferred in this invention. Examples of aliphatic diisocyanates which may be used include dicyclohexane - 4,4' - diisocyanate, tetramethylene diisocyanate, hexamethylene diisocyanate, and the like. Another desirable diisocyanate, which improves lap shear bond strength with minimum sacrifice in hydraulic fluid resistance, is 4,4'-methylene-bis(cyclohexyl isocyanate) which is a cycloaliphatic compound, and which is available in commerce under the tradename Hylene W (E. I. du Pont). Aliphatic ester diisocyanates are outstandingly useful. These esters are typified by diisocyanates of caproic acid diisocyanates which have been esterified by lower ($C_1$–$C_4$) alcohols, these being typified in commerce by lysine diisocyanate which is the methyl ester of caproic acid diisocyanate.

The diols which may be used in the invention are low molecular weight dihydroxy compounds having a molecular weight up to about 200 but preferably having a molecular weight up to about 150. These may be ordinary glycols such as ethylene glycol propylene glycols but other glycols such as butylene glycol may be used. The preferred glycols are ether glycols and especially thio-ether glycols. Thus diethylene glycol, dipropylene glycol and triethylene glycol are quite useful. The thio glycols are particularly preferred and the invention will be illustrated using thio diethylene glycol, but diethylene glycol is also superior.

The reaction between the diol and the diisocyanate is preferably carried out in concentrated solvent solution (typically 85%) in an inert water-free solvent such as methyl ethyl ketone and the reaction is carried out by cooking at moderate temperature e.g., 65° C. until an adequate molecular weight build has occurred as evidenced by a reduction in the isocyanate content to 4.9 grams per 100 grams of solution. This indicates in the preferred reaction the consumption of about 79% of the available isocyanate functionality, but broadly the reaction may consume 60% to 90% of the available isocyanate functionality, with the preferred extent of reaction being from 70% to 85%.

The polyepoxide and the isocyanate prepolymer are combined to provide a significant excess of hydroxy groups in the polyepoxide over the isocyanate groups in the prepolymer. On a stoichiometric basis an excess of at least 2 to 1 is utilized, with the preferred excess being at least 2.2 to 1. An excess of up to about 4 to 1 may be utilized, but preferably the excess does not exceed 3 to 1. A ratio of hydroxy to isocyanate of 2.54 to 1 will be used to illustrate this invention.

The reaction product of polyepoxide and the isocyanate prepolymer is utilized in relatively concentrated organic solvent medium, usually at least 40% solids or more, preferably at least 60%.

While solvent need not be used, a small proportion of inert organic solvent is desirably present to ease the reaction, and the invention will be illustrated using methyl ethyl ketone at a solids content of about 65%. The solvent is used to thin each of the reactants which are then simply mixed together and heated to permit the reaction to go to completion. Only moderate heat is needed, but it is preferred to employ a temperature of at least about 50° C. and a catalyst such as dibutyl tin dilaurate to insure that the isocyanate reactivity is completely consumed with side reactions minimized. It is best to remain under 80° C. to minimize the reactivity of the epoxy group since this also provides side reactions.

It is convenient to add the isocyanate prepolymer to the epoxy solution in the manner of a titration so that the resin which is formed may be brought close to the point of gelation.

Particularly outstanding properties are obtained when the aliphatic ester diisocyanate-lysine diisocyanate is combined with thio diethylene glycol. This selection provides excellent bond strength, excellent adhesion, excellent hydraulic fluid resistance and excellent corrosion resistance. Moreover, the strength properties are maintained at both high and low temperatures, e.g., 67° F. to 250° F.

It is particularly preferred to employ diepoxides which are diglycidyl ethers of a bisphenol having a molecular weight in the range of from 500–1400 and to balance the weight proportion of urethane to diepoxide so as to employ from 32–45% by weight of urethane to from 55–68% by weight of diepoxide.

From the standpoint of lamination, the primed surfaces prepared as described are joined together using conventional epoxy adhesives which are well known per se and which are made up as needed by mixing together a resinous polyepoxide and an amine curing agent therefor.

The invention is illustrated in the examples which follow.

EXAMPLE I

Preparation of a primer containing 38% urethane, 62% epoxy resin. Procedure: Into a flamed out, five liter flask fitted with a condenser, nitrogen inlet, thermometer, stirrer and addition funnel are charged 2332 grams (11 moles) of the methyl ester of caproic acid diisocyanate (NCO content=39.6%). The diisocyanate is heated to 60° C. with stirring under a nitrogen blanket. Three drops of dibutyl tin dilaurate are added followed by 794.75 grams (6.51 moles) thiodiethyleneglycol. The thiodiethyleneglycol is added slowly so that the temperature remains at 65° C. throughout the addition. 550 grams of sieve-dried methyl ethyl ketone are added followed by 140.25 grams (1.15 moles) thiodiethyleneglycol. Again the temperature is maintained at 65° C. throughout the additions. The thiodiethyleneglycol addition takes about five hours, and the prepolymer solution so prepared is cooled down to room temperature and stored under nitrogen in lined cans. The prepolymer solution has an NCO content of 4.9% at 85% solids.

Into a five liter flask fitted with nitrogen inlet, moisture trap, condenser, thermometer and stirrer are charged 1800 grams (2.54 moles) diglycidyl ether of bisphenol A [2,2'-bis(p-hydroxyphenylpropane)] [1] and 500 grams toluene. This mixture is heated to reflux (127° C.) and held at this temperature for 3 hours. The solution is then cooled down to 45° C., and the trap contents are removed (3 cc. $H_2O$ and 17 cc. toluene). 1274.2 grams of the urethane prepolymer solution (1090.59 grams of resin) are added to the epoxy solution followed by a rinse of 1000 grams of sieve dried methyl ethyl ketone. Three drops of dibutyl tin dilaurate are added, and the solution is heated to 65° C. and held at this temperature for four hours. The resulting polymer is cooled down to room temperature and poured into containers.

Physical properties:
  Solids content _____ 63.17.
  Percent epoxy _____ 62.27.
  Percent polyurethane _ 37.27.
  Gardner viscosity ___ Z to $Z_1$.
  Appearance _____ Clear, straw yellow solution.
  NCO content _____ Undeterminable, less than 0.1.

EXAMPLE II

Into a two liter resin kettle was charged 750 grams (1.056 moles) of the same epoxy resin used in Example I, 85.3 grams (0.699 moles) sieve dried thiodiethyleneglycol and 500 grams sieve dried methyl ethyl ketone. This mixture is heated while under a nitrogen blanket and with stirring to 65° C. Two drops of dibutyl tin dilaurate are added followed by 286.4 grams (1.085 moles) of 4,4'-methylenebis(cyclohexyl isocyanate). The diisocyanate is added at such a rate that the temperature

---

[1] Average molecular weight 710, epoxide equivalent weight =312, hydroxide equivalent weight=476, melting point 40–45° C.

remains at 65° C. The urethane solution is then heated for four hours at 65° C., and then cooled down to room temperature and poured into containers.

Physical properties:
- Solids content _____ 61.57%.
- Epoxy content _____ 66.86%.
- Thiodiethyleneglycol content __ 7.60%.
- Diisocyanate content _____ 25.53%.
- Gardner viscosity _____ XY.
- Appearance _____ Clear, straw yellow solution.

The resin of Example I is catalyzed and reduced for spraying as follows:

|  | Grams |
|---|---|
| Product of Example I (63.17% solids) | 500 |
| N-aminoethyl piperizine | 27 |
| Methyl ethyl ketone | 1500 |
| N - beta - aminoethyl - gamma-aminopropyltrimethoxysilane | 7 |

The above bonding primer clear is stirred on a magnetic stirrer at room temperature for 10 minutes and then allowed to stand (induction time) about one hour before spraying in an ordinary air spray gun. The composition is stable for several days in the presence of solvent. When the solvent flashes off, the mixture will cure at room temperature.

The aluminum panels to be primed are prepared for spraying as follows:
(1) Wiped with methyl ethyl ketone by dust-free towels.
(2) Alkaline cleaned[2] for 2 minutes at 160° to 180° F.
(3) Rinse in deionized water.
(4) Acid chromate etch for 10 minutes at 150–155° F. in the following etch bath:

|  | Grams |
|---|---|
| Deionized water | 19,260 |
| Sulfuric acid | 7,372.4 |
| $Na_2Cr_2O_7 \cdot 2H_2O$ | 793.6 |

(5) Rinse with deionized water.
(6) Drip dry at room temperature and then dry for 20 minutes.

The primer formulation is then sprayed over the above-prepared panels at thirty pounds per square inch pressure with the number of passes being varied to obtain the desired 0.2–1.0 mil film thicknesses. After a 15 minute flash-off time, the panels are cured for 30 minutes at 250° F.

The tests to which the coated panels are subjected are as follows:

Initial pencil hardness
Pencil hardness after thirty days immersion in phosphinate ester hydraulic fluid (Skydrol 500 A)[3] at ambient temperature and at 150° F.
Room temperature and −67° F. drum peel at various film thicknesses (Standard ASTM Test D1781).
250° F. lap shear (Standard ASTM Test D1002–53T).

The specimens are bonded with a 1″ wide fabric impregnated with a stable mixture of epoxy adhesive[4] and dicyandiamide curing agent, with the mixture providing a tacky solid. Bonding is carried out in an autoclavve 90 minutes at 250° F. using 45 pounds per square inch bonding pressure. Some of the non-bonded panels which are tested are subjected to the same 90 minute cure at 250° F., and other of these non-bonded panels are subjected to a cure of 7 days at room temperature.

| Room temperature drum peel measured in pounds per inch of width (1″ wide sample) | | | | | −67° F. drum peel | | 250° F. lap shear (p.s.i.) |
|---|---|---|---|---|---|---|---|
| Film thickness in mils of the cured primer | | | | | | | |
| 0.2 | 0.4 | 0.6 | 0.8 | 1.0 | 0.2 | 0.5 | 588 |
| Peel strength (pounds per inch of width) | | | | | | | |
| 74.3 | 73.3 | 72.2 | _____ | 69.9 | 50.0 | 14.5 | _____ |

| Cure | Initial pencil hardness | Pencil hardness after 30 days immersion in hydraulic fluid at— | |
|---|---|---|---|
| | | Ambient temperature | 150° F. |
| 90 minutes at 250° F. | 5H | 4H | 3H |
| 7 days at ambient temperature | 4H | 3H | 2H |

As will be evident, the drum peel and lap shear tests are conducted on the laminated or bonded panels whereas the pencil hardness tests following hydraulic fluid immersion are conducted on the non-bonded panels.

The invention is defined in the claims which follow.
We claim:
1. An epoxy-functional organic solvent-soluble resin particularly adapted for use in the priming off cleaned aluminum surfaces comprising an isocyanate-terminated polyurethane and resinous hydroxy containing polyepoxide, said polyurethane being a reaction product of excess organic diisocyanate and diol having a molecular weight up to about 200, the molar ratio of diisocyanate to diol being in the range of 1.2:1 to 1.75:1 and from 60 to 90% of the isocyanate functionality of said diisocyanate being consumed by reaction with said diol, said resinous polyepoxide having an epoxy equivalency of at least 1.4, and an hydroxy equivalency in the range of .75 to 1.9, said polyurethane and said polyepoxide being employed in amounts to provide a ratio of hydroxy functionality in said polyepoxide to isocyanate functionality in said polyurethane in the range of 2:1 to 4:1, the hydroxy groups of said polyepoxide being reacted with the isocyanate groups of said polyurethane to substantially completely consume the isocyanate functionality of said polyurethane.

2. An epoxy-functional organic solvent-soluble resin as recited in claim 1 in which said molar ratio of diisocyanate to diol is in the range of 1.3:1 to 1.6:1 and said diisocyanate is aliphatic.

3. An epoxy-functional organic solvent-soluble resin as recited in claim 1 in which said polyurethane and said polyepoxide are employed in amounts to provide a ratio of hydroxy functionality in said polyepoxide to isocyanate functionality in said polyurethane of 2.2:1 to 3:1.

4. An epoxy-functional organic solvent-soluble resin as recited in claim 1 in which said diol is thiodiethylene glycol.

5. An epoxy-functional organic solvent-soluble resin resin as recited in claim 1 in which said organic diisocyanate is an aliphatic ester diisocyanate.

6. An epoxy-functional organic solvent-soluble resin as recited in claim 5 in which said ester diisocyanate is the methyl ester of caproic acid diisocyanate.

7. An epoxy-functional organic solvent-soluble resin as recited in claim 1 in which said polyepoxide has an epoxy equivalency of from about 1.8 to 2.4.

8. An epoxy-functional organic solvent-soluble resin as recited in claim 7 in which said polyepoxide is a polyglycidyl ether of a bisphenol having an epoxy equivalency in the range of 2.1 to 2.3.

---
[2] The alkaline cleaning agent is a 1 : 1 weight ratio mixture of potassium hydroxide and potassium silicate (10 ozs. dissolved in 5 gallons of deionized water). The commercial material Ridoline 53 (Amchem, Detroit, Mich.) can be used in place of the mixture of potassium hydroxide and potassium silicate.
[3] An hydraulic fluid having a specific gravity of 1.00, an acid value of 0.25 and a flash point of 320° F. (available from Monsanto).
[4] The epoxy component of the adhesive may have an average molecular weight in the range of from 300–900, but is typified in commerce by a diglycidyl ether of bisphenol A having an average molecular weight of about 600. This provides a solid coating which is tacky to the touch. The dicyandiamide is present in an amount of about 5% by weight.

9. An epoxy-functional organic solvent-soluble resin as recited in claim 8 in which said bisphenol-based polyepoxide has a molecular weight in the range of 500–1400 and said polyurethane and said polyepoxide are employed in weight proportions of from 32–45% polyurethane to 55–68% polyepoxide.

10. An epoxy-functional organic solvent-soluble resin as recited in claim 1 in which the reaction between said diisocyanate and said diol is carried out in concentrated solvent solution in an inert water-free organic solvent.

11. An epoxy-functional organic solvent-soluble resin as recited in claim 1 in which said diol is diethylene glycol.

12. A primer comprising an organic solvent having dissolved therein the epoxy-functional resin of claim 1 in a concentration of at least 40%.

13. A primer as recited in claim 12 in which said solvent further includes an amine curing agent for said epoxy-functional resin.

14. A primer as recited in claim 13 in which said amine curing agent comprises N-amino ethyl piperazine.

15. A primer as recited in claim 13 in which said amine curing agent comprises an amino-substituted polyalkoxysilane in admixture with an organic amine.

16. Aluminum having its surface primed with a baked film of the solution of claim 12.

17. A laminate comprising panels of the primed aluminum of claim 16 bonded together under heat and pressure with an epoxy adhesive.

References Cited

UNITED STATES PATENTS

| | | | |
|---|---|---|---|
| 3,525,779 | 8/1970 | Hawkins | 260—830 P |
| 3,148,167 | 9/1964 | Keplinger | 260—230 P |
| 3,158,586 | 11/1964 | Krause | 260—830 P |
| 3,282,896 | 11/1966 | Einberg | 260—830 P |
| 3,290,208 | 12/1966 | Lewis | 260—830 P |
| 3,309,261 | 3/1967 | Schiller | 260—830 P |
| 3,380,950 | 4/1968 | Blomeyer | 260—830 P |
| 3,391,054 | 7/1968 | Lewis | 260—830 P |
| 3,510,439 | 5/1970 | Kaltenback | 260—830 P |
| 3,558,408 | 1/1971 | Hamilton | 260—830 P |
| 3,565,972 | 2/1971 | Harris | 260—830 P |

FOREIGN PATENTS

| | | | |
|---|---|---|---|
| 6,611,129 | 2/1968 | Netherlands | 260—830 P |
| 763,347 | 10/1954 | Great Britain | 260—830 P |

PAUL LIEBERMAN, Primary Examiner

U.S. Cl. X.R.

117—132 BE, 135.1; 156—329, 330, 331; 161—186, 190; 260—47 EN, 77.5 AM, 77.5 AP, 824 EP

UNITED STATES PATENT OFFICE
CERTIFICATE OF CORRECTION

Patent No. 3,660,523           Dated May 2, 1972

Inventor(s) John R. Grawe and Raymond J. Bissig

It is certified that error appears in the above-identified patent and that said Letters Patent are hereby corrected as shown below:

Column 1, in the heading, "Desoto,Inc." should read --DeSoto, Inc.; column 1, line 19, "amout" should read --about --. column 3, line 33, before "solvent" insert --organic--; column 4, line 58, "37.27" should read --37.73--; column 5, line 45, after "minutes" and before the period (.) insert --at 150°F.--; column 6, line 2, "autoclave" is misspelled; column 6, claim 1, line 2, "off" should read --of--; column 6, claim 5, line 2, delete "resin".

Signed and sealed this 27th day of March 1973.

(SEAL)
Attest:

EDWARD M. FLETCHER, JR.           ROBERT GOTTSCHALK
Attesting Officer           Commissioner of Patents